United States Patent
Delgado et al.

(10) Patent No.: US 10,191,849 B2
(45) Date of Patent: Jan. 29, 2019

(54) SIZING CACHE DATA STRUCTURES USING FRACTAL ORGANIZATION OF AN ORDERED SEQUENCE

(71) Applicant: VMware, Inc., Palo Alto, CA (US)

(72) Inventors: Jorge Guerra Delgado, Sunnyvale, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 235 days.

(21) Appl. No.: 14/969,768

(22) Filed: Dec. 15, 2015

(65) Prior Publication Data

US 2017/0168948 A1 Jun. 15, 2017

(51) Int. Cl.
*G06F 3/06* (2006.01)
*G06F 12/0864* (2016.01)
*G06F 12/0871* (2016.01)
*G06F 12/0893* (2016.01)

(52) U.S. Cl.
CPC .......... *G06F 12/0864* (2013.01); *G06F 3/061* (2013.01); *G06F 3/0656* (2013.01); *G06F 3/0673* (2013.01); *G06F 12/0871* (2013.01); *G06F 12/0893* (2013.01); *G06F 2212/1016* (2013.01); *G06F 2212/222* (2013.01); *G06F 2212/601* (2013.01)

(58) Field of Classification Search
CPC .... G06F 12/0864; G06F 3/061; G06F 3/0656; G06F 3/0673; G05F 2212/222; G05F 2212/60
See application file for complete search history.

(56) References Cited

U.S. PATENT DOCUMENTS

| | | | | |
|---|---|---|---|---|
| 2012/0124295 | A1* | 5/2012 | Humlicek | G06F 12/0646 711/136 |
| 2013/0326154 | A1* | 12/2013 | Haswell | G06F 12/0864 711/141 |
| 2014/0075144 | A1* | 3/2014 | Sanders | G06F 12/02 711/170 |
| 2014/0379992 | A1* | 12/2014 | Dey | G06F 12/0808 711/135 |
| 2015/0149730 | A1* | 5/2015 | Hu | G06F 3/0613 711/136 |
| 2015/0254000 | A1 | 9/2015 | Sivathanu et al. | |

* cited by examiner

*Primary Examiner* — Ann J Lo
*Assistant Examiner* — Jane Wei
(74) *Attorney, Agent, or Firm* — Patterson & Sheridan, LLP (57) ABSTRACT

A cache is sized using an ordered data structure having data elements that represent different target locations of input-output operations (IOs), and are sorted according to an access recency parameter. The cache sizing method includes continually updating the ordered data structure to arrange the data elements in the order of the access recency parameter as new IOs are issued, and setting a size of the cache based on the access recency parameters of the data elements in the ordered data structure. The ordered data structure includes a plurality of ranked ring buffers, each having a pointer that indicates a start position of the ring buffer. The updating of the ordered data structure in response to a new IO includes updating one position in at least one ring buffer and at least one pointer.

20 Claims, 12 Drawing Sheets

| 220 | 185 | 154 | -   |
|-----|-----|-----|-----|
| 219 | 183 | 160 | -   |
| 218 | 170 | 159 | 153 |
| 190 | 189 | 155 | 150 |
| 0   | 3   | 1   | 2   |

| 220 | 185 | 170 | -   |
|-----|-----|-----|-----|
| 219 | 184 | 160 | 154 |
| 218 | 183 | 159 | 153 |
| 190 | 189 | 155 | 150 |
| 0   | 3   | 0   | 1   |

| 220 | 185 | 154 | - |
|---|---|---|---|
| 219 | 183 | 160 | - |
| 218 | 170 | 159 | 153 |
| 190 | 189 | 155 | 150 |
| 0 | 3 | ▨ | ▨ |

| 220 | 185 | 154 | - |
|---|---|---|---|
| 219 | 170 | 153 | - |
| 218 | 160 | 159 | - |
| 190 | 189 | 155 | 150 |
| 0 | 3 | 2 | 3 |

| 220 | 185 | ►154 | - |
|---|---|---|---|
| 219 | 183 | 160 | - |
| 218 | ►170 | 159 | 153 |
| 190◄ | 189 | 155◄ | 150 |
| ⌀ | ⌀ | ⌀ | 2 |

| 220 | 185 | 170 | - |
|---|---|---|---|
| 219 | 183 | 160 | - |
| 218 | 190 | 159 | 153 |
| 221 | 189 | 154 | 150 |
| 3 | 2 | 0 | 2 |

Time Complexity O=MN$^{1/M}$

FIG. 9

|  | Index | Insert/Delete | Search |
|---|---|---|---|
| Sorted Array | O(1) | O(N) | O(logN) |
| BTree | O(N) | O(logN) | O(logN) |
| Basic Fractal Sequence | O(1) | O($\sqrt{N}$) | O(logN) |
| Recursive Fractal Sequence | O(logN) | O(logN) | O(logN) |

FIG. 10

SIZING CACHE DATA STRUCTURES USING FRACTAL ORGANIZATION OF AN ORDERED SEQUENCE

BACKGROUND

Computer systems often use data structures to track and manage access to resources. Such data structures need to be efficient in terms of indexing operations, insert/delete operations, and search operations. An ordered sequence is a common data structure to store ordered data of fixed size. Indexing an ordered sequence of N items is simple, with a time complexity of O(1). The time complexity of a lookup operation for the ordered sequence is O(log N), which is also efficient. However, an update of the ordered sequence (insertion or deletion) has a complexity of O(N) since each element in the sequence ranked below the insertion/deletion point has to be shifted to in order maintain the order. Thus, the time complexity for insertion/deletion in an ordered sequence is poor.

A binary search tree (BTree) of N items has a time complexity of O(log N) for lookup, which is also efficient. Furthermore, an insertion/deletion update in a BTree is also efficient, with a time complexity of O(log N). However, indexing the BTree has a poor time complexity of O(N). The BTree also requires at least two additional pointers for each data item, and so the space overhead is relatively high.

As the number of resources being managed in a cloud computing environment is increasing by several orders of magnitude, improved data structures that can provide high performance in indexing operations, insert/delete operations, and search operations would be desirable.

SUMMARY

A cache is sized using an ordered data structure having data elements that represent different target locations of input-output operations (IOs), and are sorted according to an access recency parameter. The cache sizing method includes continually updating the ordered data structure to arrange the data elements in the order of the access recency parameter as new IOs are issued, and setting a size of the cache based on access recency parameters of the data elements in the ordered data structure. The ordered data structure includes a plurality of ranked ring buffers, each having a pointer that indicates a start position of the ring buffer. The updating of the ordered data structure in response to a new IO includes updating one position in at least one ring buffer and at least one pointer.

Further embodiments include a non-transitory computer-readable storage medium storing instructions that, when executed by a computer system, cause the computer system to perform the method set forth above, and a computer system programmed to carry out the method set forth above.

DETAILED DESCRIPTION

Figure 1:
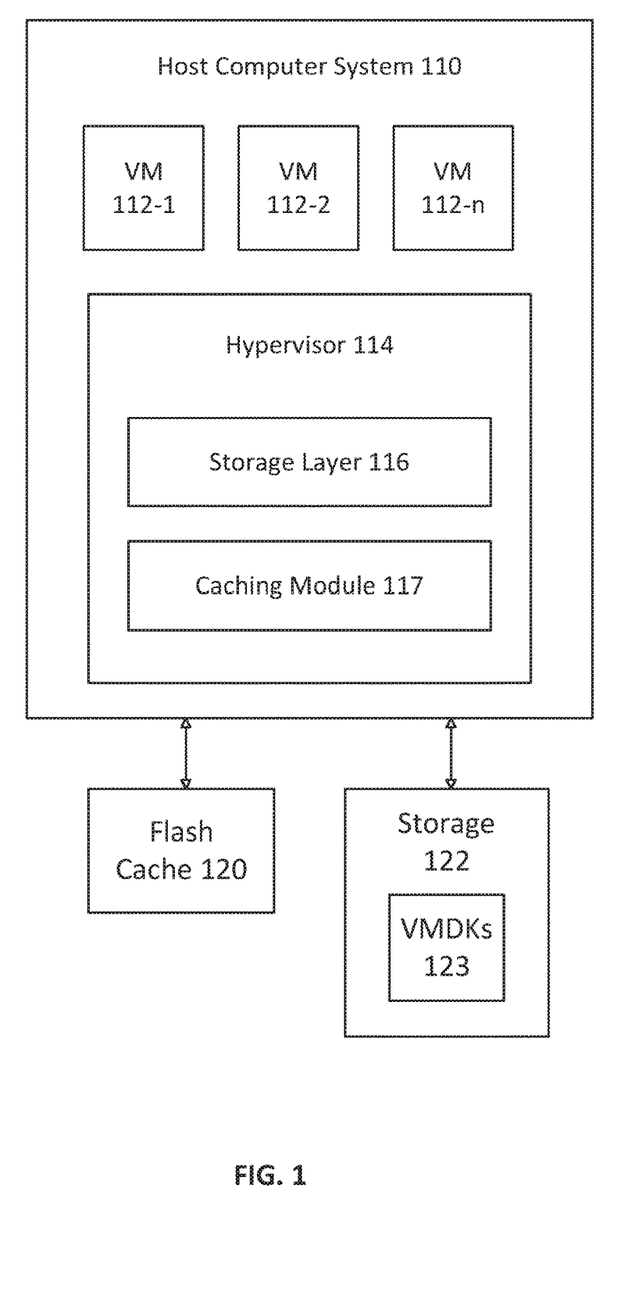
FIG. 1 depicts a block diagram of a virtual machine hosting computer according to an embodiment of the present application.

FIG. 1 depicts an embodiment of a block diagram of a host computer system ("host") 110. In the embodiments illustrated herein, host 110 is a computing system that is configured to host virtual machines, such as virtual machines (VMs) 112-1, 112-2, and 112-*n*. In other embodiments, host 110 may host other types of virtual computing instances such as containers that do not employ an operating system. Furthermore, host 110 may simply be a host for applications running on top of a host operating system.

In the illustrated embodiment, host 110 includes hypervisor 114 as a virtualization software layer. Hypervisor 114 is installed on top of the hardware platform (not illustrated) of host 110. Hypervisor 114 supports a virtual machine execution space within which one or more VMs 112 may be concurrently instantiated and executed. The hardware platform of host 110 includes conventional components of a computer system, such as a central processing unit (CPU) that may include one or more processing cores, system memory (e.g., dynamic random access memory), a network interface controller, a host bus adapter, etc. In one embodiment, hypervisor 114 is an ESXi™ hypervisor, commercially available from VMware, Inc. of Palo Alto, Calif.

During use, VMs 112 issue input-output operations (IOs) to their respective virtual disks, which are provisioned in connected storage 122 as virtual machine disk files (shown as VMDKs 123). Hypervisor 114, through its storage layer 116, translates the IOs from the VMs into IOs that target one or more storage blocks of the virtual machine disk file corresponding to issuing VM's virtual disk. Hypervisor 114 also includes a caching module 117 that employs a reserved area in system memory (e.g., IO buffer) and a flash cache 120 to cache the read data and write data associated with the IOs issued by hypervisor 114. As a way to track the recency of the IOs that are issued, caching module 117 assigns a unique IO number to each IO that is issued. In one embodiment, the IO number is incremented each time a new IO is issued and the incremented IO number is assigned to that newly issued IO.

In one embodiment, storage 122 is remote to host 110, and accessed as a network-attached storage, a storage area network (SAN), or a virtual SAN. In one embodiment, flash cache 120 is connected locally to host 110 and includes storage devices, such as flash memory, that have lower IO latency compared to storage 122. In other embodiments, flash cache 120 is shared among a plurality of hosts.

An IO issued by storage layer 116 of hypervisor 114 includes an LBA targeted by the IO (read or write IO). In order to determine whether valid contents of that LBA are cached in the IO buffer or flash cache 120, caching module 117 accesses two cache management data structures that it maintains to track what is being cached.

Figure 2:
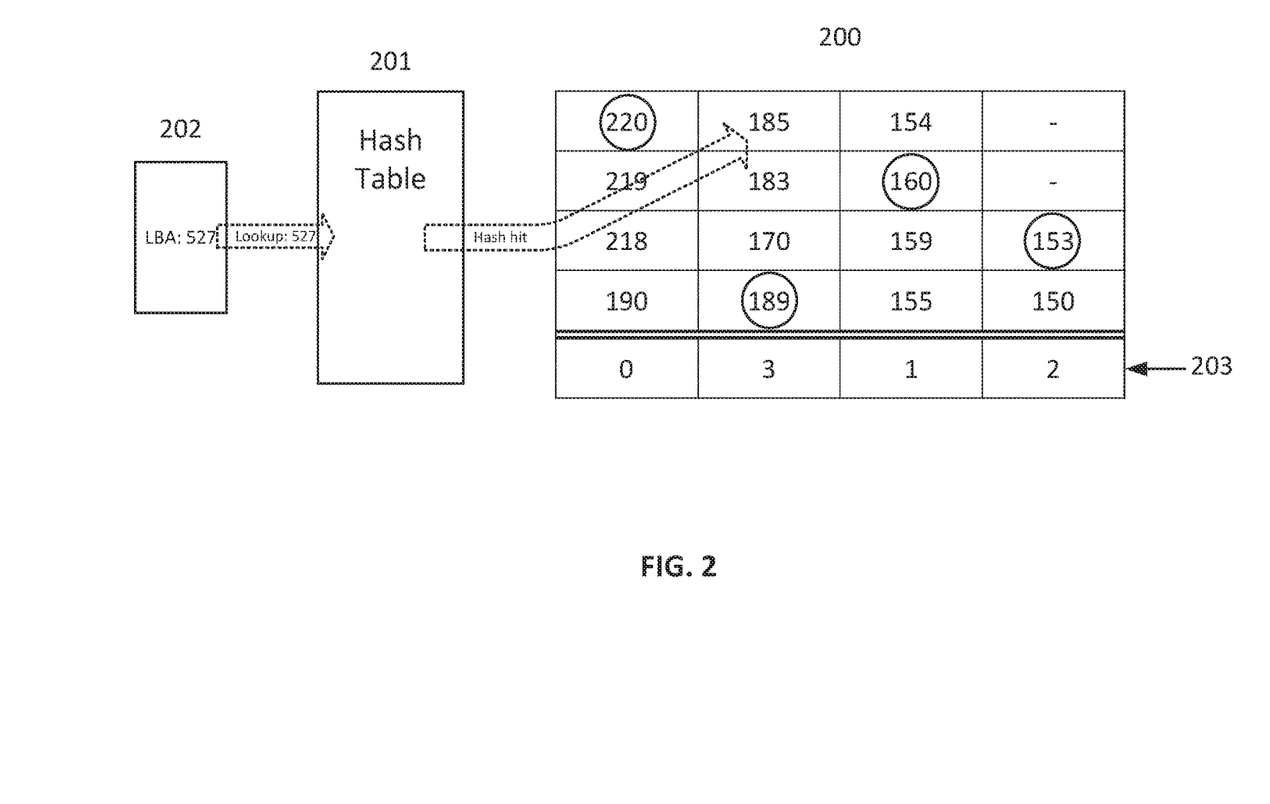
FIG. 2 depicts example data structures that may be used in the embodiment.

Access to the two cache management data structures is illustrated in FIG. 2. The first cache management data structure is a hash table 201 having entries that are indexed according to a hash of a logical block address (LBA). Each entry of hash table 201 includes an LBA of a previously issued IO whose contents are cached, and an IO number of that previously issued IO. The second cache management data structure is a ring buffer array 200. Each entry of ring buffer array 200 includes an element with an IO number of a previously issued IO whose contents are cached and a pointer to a cache location at which the contents are stored. In addition, all entries of ring buffer 200 are sorted in descending order of the IO number.

When hypervisor 114 issues a read IO, caching module 117 uses the hash of the LBA targeted by the read IO as an index into hash table 201 to determine if there is a cache hit. If there is a cache hit, caching module 117 retrieves the entry in hash table 201 corresponding to the LBA targeted by the read IO and searches ring buffer array 200 for the corresponding entry using the IO number stored in the entry retrieved from hash table 201. This search is efficient because ring buffer 200 is sorted in a descending order of the IO, and so the time complexity of this search operation is on the order of log N. If there is a cache miss, caching module 117 adds a new entry into hash table 201 and a new entry into ring buffer array 200. The new entry into hash table 201 includes the LBA targeted by the read IO and the IO number of the read IO, and is indexed using the hash of the LBA. The new entry into ring buffer array 200 is inserted at the top of ring buffer array 200 in the manner to be described below, and includes the IO number of the read IO and a pointer to a cache location at which read data (i.e., data that is returned as a result of the read IO) will be stored.

Similarly, when hypervisor 114 issues a write IO, caching module 117 uses the hash of the LBA targeted by the write IO as an index into hash table 201 to determine if there is a cache hit. If there is a cache hit, caching module 117 retrieves the entry in hash table 201 corresponding to the LBA targeted by the write IO, searches ring buffer array 200 for a corresponding entry using the IO number stored in the entry retrieved from hash table 201, and deletes that entry. In addition, caching module 117 updates the entry in hash table 201 with a new IO number, i.e., the IO number of the just issued write IO, and inserts a new entry into ring buffer 200 at the top of ring buffer array 200 in the manner to be described below. If there is a cache miss, caching module 117 adds a new entry into hash table 201 and a new entry into ring buffer array 200. The new entry into hash table 201 includes the LBA targeted by the write IO and the IO number of the write IO, and is indexed using the hash of the LBA. The new entry into ring buffer array 200 is inserted at the top of ring buffer array 200 in the manner to be described below and includes the IO number of the just issued write IO and a pointer to a cache location at which write data (i.e., data that will be written in accordance with the write IO) will be stored.

FIG. 2 illustrates an example of a read IO issued by hypervisor 114 that targets LBA of 527. In response to this IO, caching module 117 performs a hash operation on the LBA to determine if there is a cache hit. If there is a cache hit, caching module 117 locates a corresponding entry in ring buffer array 200, retrieves the cached data using the pointer stored in that entry, and passes it to hypervisor 114. If there is a cache miss, caching module 117 would then retrieve the data requested by the read IO from storage 122, add the read data to the cache, and update hash table 201 and ring buffer array 200 accordingly.

Further description of ring buffer array 200 is now provided. Ring buffer array 200 includes multiple columns and each column is configured as a ring buffer. Ring buffer array 200 includes an auxiliary index row 203 below the last row. The insert/delete and search operations relating to the ring buffer array 200 are carried out by caching module 117 as depicted in FIGS. 3-8. In general, ring buffer array 200 includes N elements arranged in an $\sqrt{N}\times\sqrt{N}$ ordered array, with an auxiliary index row 203 indicating the start of ordered elements in the corresponding column. However, in the specific examples given below, only 16 ordered elements are depicted so as to simplify the illustration.

Figure 3:
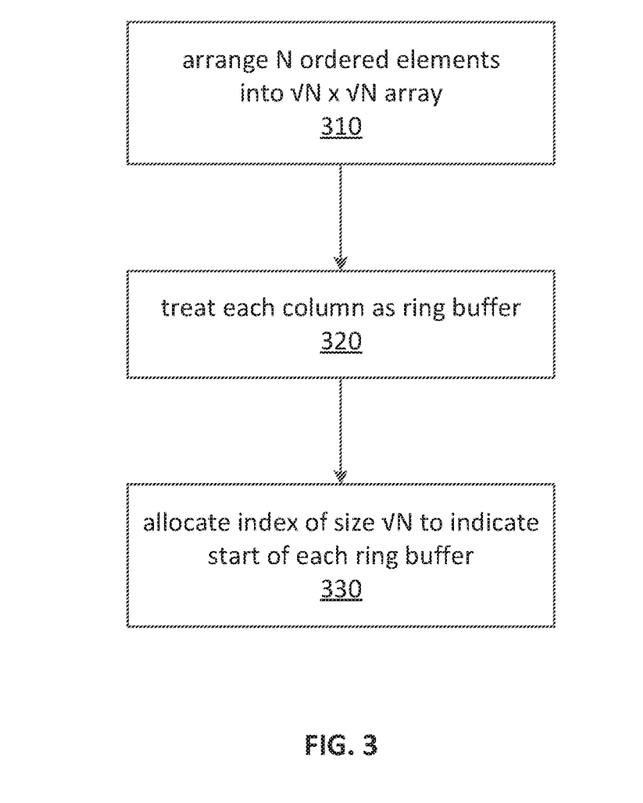
FIG. 3 depicts an example sequence of operations for indexing a data structure used in the embodiment.

FIG. 3 depicts example operations for generally arranging and indexing N elements into the $\sqrt{N}\times\sqrt{N}$ ring buffer array 200. As indicated in FIG. 3, in ACT 310, each of the N elements are ordered and arranged into ring buffer array 200. Ring buffer array 200 has $\sqrt{N}$ columns. In ACT 320, each of the $\sqrt{N}$ columns is treated as a ring buffer. That is, a start position of the ordered elements within a column can be arbitrarily set, and the elements are arranged in decreasing order from the set starting position, wrapping around as a ring. Here, the elements are decreasing because a higher IO number indicates more recently accessed item. In ACT 330, a row of $\sqrt{N}$ elements is allocated for the auxiliary index 203. Each element in the auxiliary index 203 indicates the starting (highest) position of the ordered elements in the corresponding column. The starting element of the ordered elements for each column may be referred to as an indexed element. In the example, each element in a column is smaller than the smallest element of the column to the left. Each column may be referred to as a single ring buffer R.

Figure 4A:
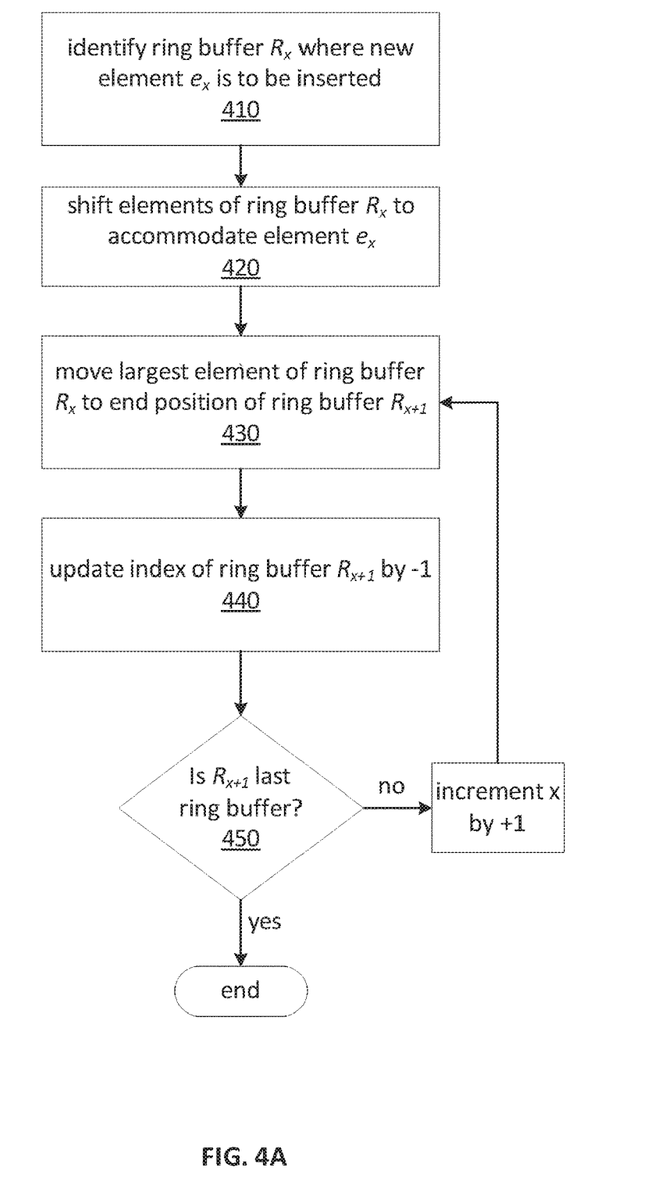
FIG. 4A depicts an example sequence of operations for inserting an element into the data structure.
Figure 4B:
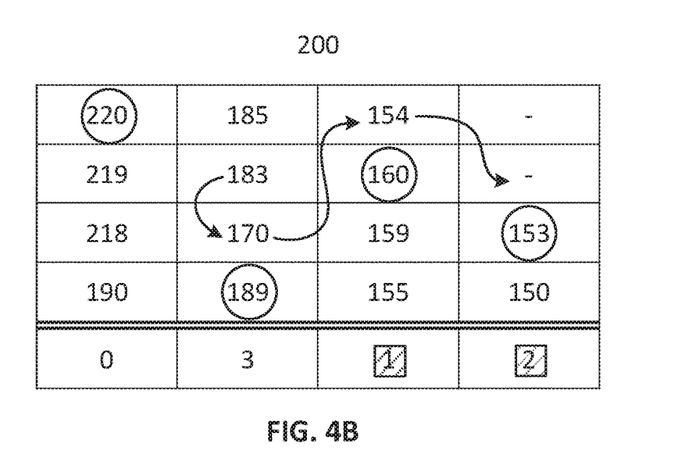
FIG. 4B depicts movements of elements of the data structure in accordance with the operations of FIG. 4A.
Figure 4C:
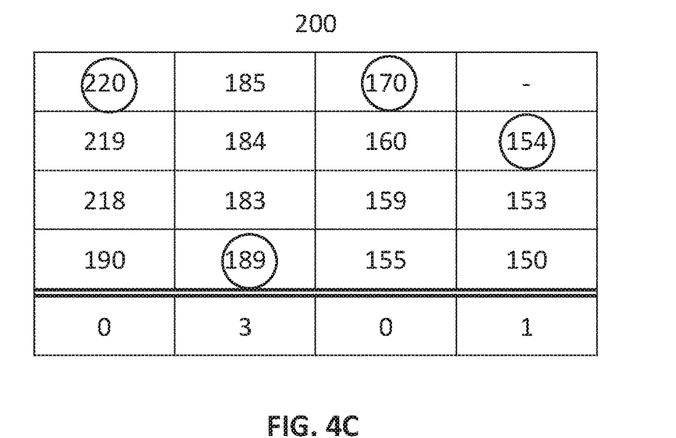
FIG. 4C depicts the elements of the data structure after the operations of FIG. 4A.

A general insertion operation for inserting new element $e_x$ is now described, with reference to FIGS. 4A, 4B and 4C. In ACT 410, the ring buffer $R_x$, into which the element $e_x$ is to be inserted, is identified. In the example shown in FIGS. 4B and 4C, element "184" is to be inserted into the second column of ring buffer array 200.

In ACT 420, all elements smaller than element $e_x$ are shifted to one lower position in the ring buffer R, and element $e_x$ is inserted into the available position. In the example, the "184" is between "185" and "183," so "183" is moved to the next lower position, and "184" is inserted into the position previously occupied by "183."

In ACT 430, the smallest element of ring buffer $R_x$ is moved to the position of the smallest element of ring buffer $R_{x+1}$. In the example, "170" is the smallest element of the second column, so "170" is moved to the position occupied by "154," which was the smallest element of the third column. It is noted that the index of ring buffer $R_x$ does not need to be updated because the element $e_x$ either takes the position of the indexed element (being larger than all of the elements in ring buffer $R_x$) or takes a position smaller than the indexed element.

In ACT 440, the index of the ring buffer $R_{x+1}$ is updated by −1. In the example, the index of the third column is updated from 1 to 0.

In Act 450, a determination of whether ring buffer $R_{x+1}$ is the last ring buffer of the array is made. If ring buffer $R_{x+1}$ is the last ring buffer of the array (YES in ACT 450), processing ends. If ring buffer $R_{x+1}$ is not the last ring buffer of the array (NO in ACT 450), x is incremented by +1, and processing returns to ACT 430. That is, the smallest element of each subsequent ring buffer is moved to the position of the smallest element of the next larger ring buffer, and the indexes updated accordingly. It is noted that the smallest position in any ring buffer is the position immediately following the position of the indexed element. Also, in the last ring buffer, there may be empty positions as can be seen in the example. In the example, the third column is not the last column, so the "154" is moved to the smallest position of the fourth column, and the index of the fourth column is updated from 2 to 1. The fourth column is the last column, so processing ends.

As can be seen from the preceding, inserting an element into the ring buffer array requires moving only at most $\sqrt{N}$ items (and $\sqrt{N}$ indexing operations), so the time complexity of insertion is $O(\sqrt{N})$. Accordingly, rewriting each element below the inserted element is avoided. Significant rewriting processing is saved relative to the traditional ordered sequence structure, which has time complexity of O(N) for insertion.

Insertion of an element into the middle of the ring buffer array 200 has been described for completeness of the description of an insert operation. However, as described above, according to certain embodiments, insertion operations for the second cache data structure generally occur at the top (i.e., first position) of the ring buffer array 200.

Figure 5A:
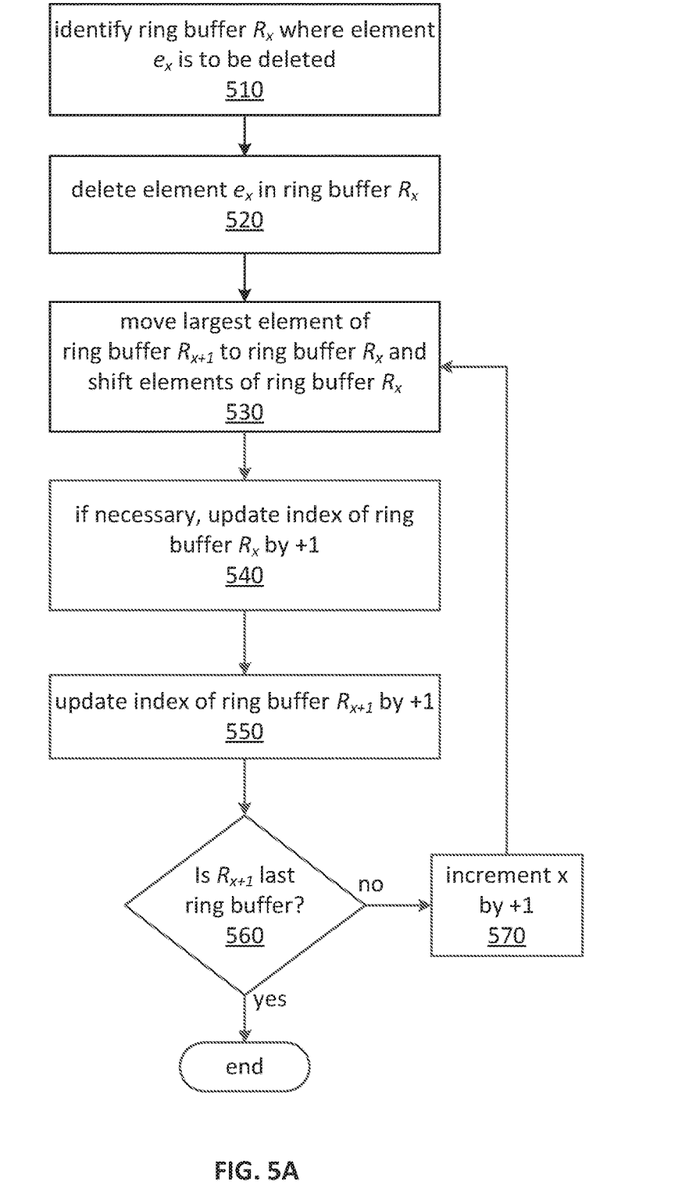
FIG. 5A depicts an example sequence of operations for deleting an element from the data structure.
Figure 5B:
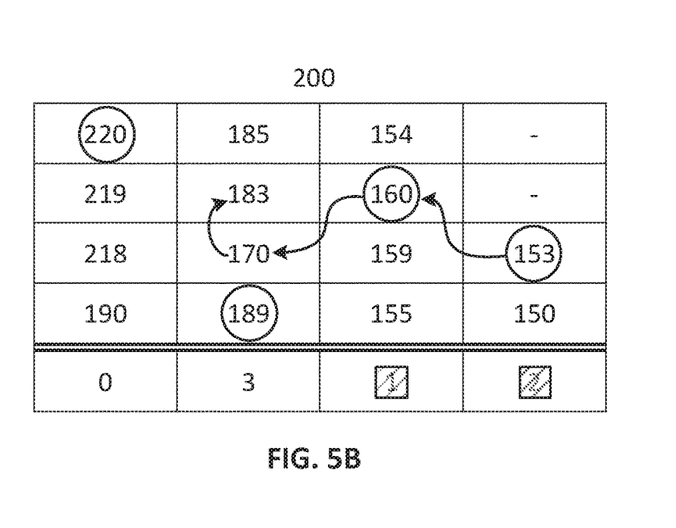
FIG. 5B depicts movements of elements of the data structure in accordance with the operations of FIG. 5A.
Figure 5C:
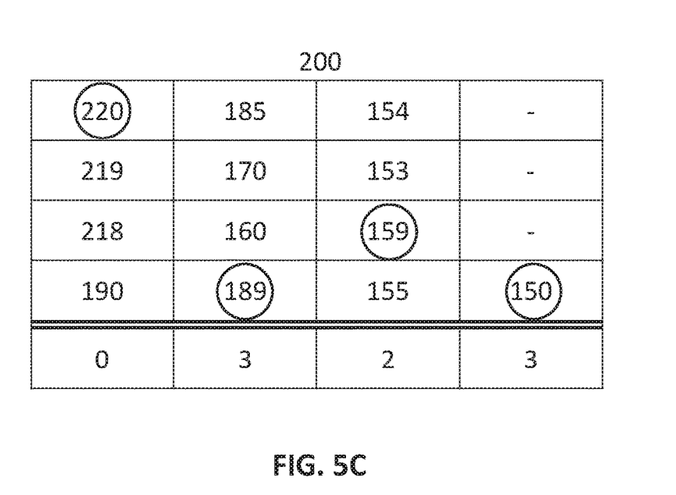
FIG. 5C depicts the elements of the data structure after the operations of FIG. 5A.

FIGS. 5A, 5B and 5C illustrate a deletion operation. In ACT 510, the ring buffer $R_x$, into which the element $e_x$ is to be deleted, is identified. In the example shown in FIGS. 5B and 5C, the "183" is to be deleted from the second column of ring buffer array 200, because the data block corresponding to IO 183 is to be moved to a different (first) position in flash cache 120 because new data is being written into that data block. The insertion is performed as described above.

In ACT 520, element $e_x$ is deleted. In the example, "183" is deleted.

In ACT 530, the indexed (i.e., largest) element of ring buffer $R_{x+1}$ is moved to the position of the smallest element of ring buffer $R_x$ and elements smaller than element $e_x$ are shifted to one higher position in the ring buffer $R_x$ to make room for the element moved from ring buffer $R_{x+1}$. In the example, "160" is the largest element of the third column, so "160" is moved to the smallest position of the second column (position previously occupied by "170") and "170" is shifted to the position previously occupied by the deleted item.

In ACT 540, the index of the ring buffer $R_x$ is updated by +1 if necessary. The index may need to be updated if the element being deleted is the indexed element. In the example, the indexed element "189" is not deleted, so the index does not need to be updated. If, for example, "189" was to be deleted, the index of the second column would be changed from 3 to 0.

In ACT 550, the index of the ring buffer $R_{x+1}$ is updated by +1 because the largest element of this ring buffer has been moved and the next largest element resides in the next position of this ring buffer. In the example, the index of the third column in changed from 1 to 2.

In Act 560, a determination of whether ring buffer $R_{x+1}$ is the last ring buffer of the array is made. If ring buffer $R_{x+1}$ is the last ring buffer of the array (YES in ACT 560), processing ends. If ring buffer $R_{x+1}$ is not the last ring buffer of the array (NO in ACT 450), x is incremented by +1, and processing returns to ACT 530. That is, for each ring buffer after ring buffer $R_x$, the largest element of each subsequent ring buffer is moved to the position of the indexed element of the preceding ring buffer, and the indexes updated accordingly. In the example, the third column is not the last column, so the "153" is moved from the index position of the fourth column to the index position of the third column (where "160" was moved from), and the index of the fourth column is updated from 2 to 3. The fourth column is the last column, so processing ends.

Similar to an insertion operation, deleting an element from the ring buffer array requires moving only at most $\sqrt{N}$ items (and $\sqrt{N}$ indexing operations), so the time complexity of insertion is $O(\sqrt{N})$, and rewriting each element above the deleted element is avoided. Thus, significant rewriting processing is saved relative to the traditional ordered sequence structure, which has time complexity of O(N) for deletion.

Generally, when a cache miss is determined as a result of new IO, a new element corresponding to the new IO is added to the top (first position) of the ring buffer array, and updating is performed on only a single element and the index of each ring buffer.

Generally, when a cache hit is determined as a result of the new IO, the element corresponding to a previously issued IO targeting the same LBA as the new IO is deleted from its current position, as described above in connection with FIGS. 5A-5C, and then a new element corresponding to the new IO is added to the first ring buffer array, as described above in connection with FIGS. 4A-4C. The combination of deleting from the current position and inserting at the top position is described further below in connection with FIGS. 6A-6C.

A cache hit may be a cache hit on an element in the first ring buffer or on a ring buffer other than the first ring buffer ("middle ring buffer"). If the position of the cache hit is on the first ring buffer, only the elements in the first ring buffer are between the updated, and the other ring buffers are unchanged.

If the cache hit is on a middle ring buffer, updating is performed on only a single element of the first ring buffer and on each ring buffer between the first ring buffer and the middle ring buffer. In the middle ring buffer, each element from the smallest position to the position just below the position of the cache hit is shifted up one position. Accordingly, only a single update is required in the first row and each row up to the middle row from which the element was deleted. The number of updates required in the middle row is less than the total number of elements in the middle row.

Figure 6A:
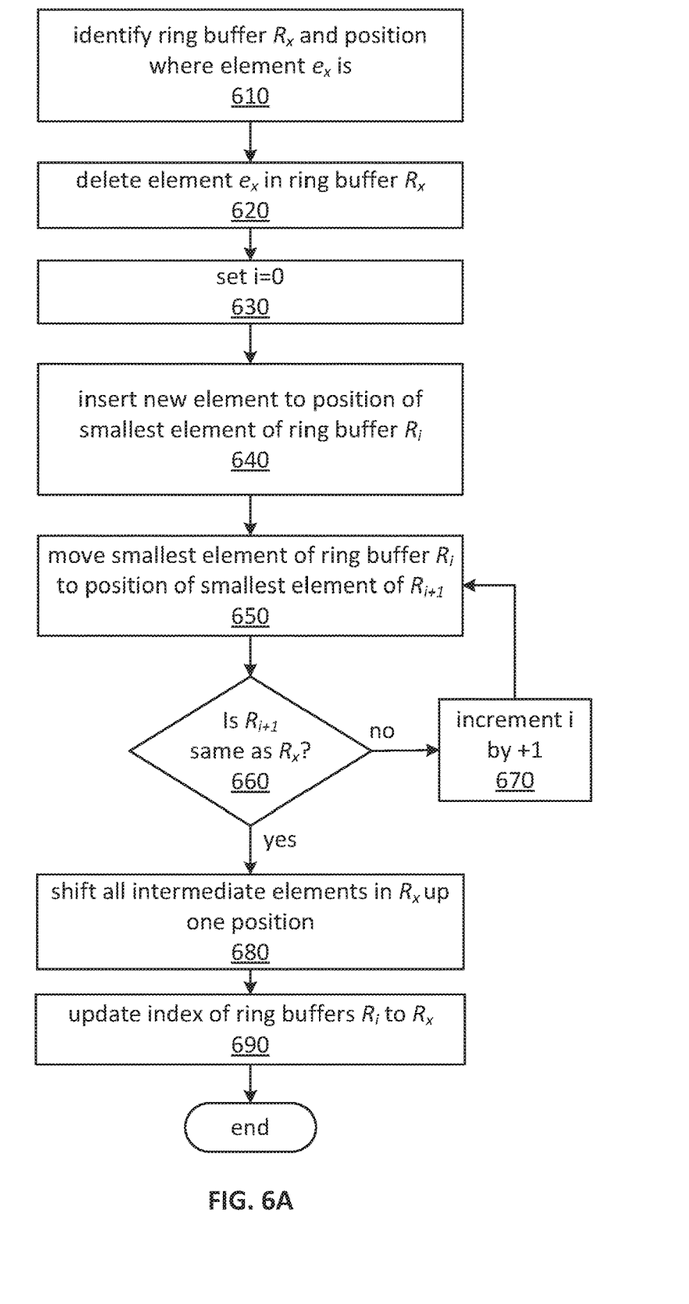
FIG. 6A depicts an example sequence of operations for moving an element from the middle of the data structure to the top of the data structure.
Figure 6B:
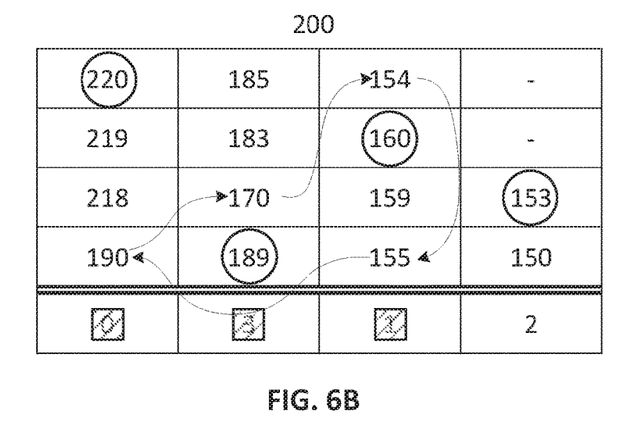
FIG. 6B depicts movements of elements of the data structure in accordance with the operations of FIG. 6A.
Figure 6C:
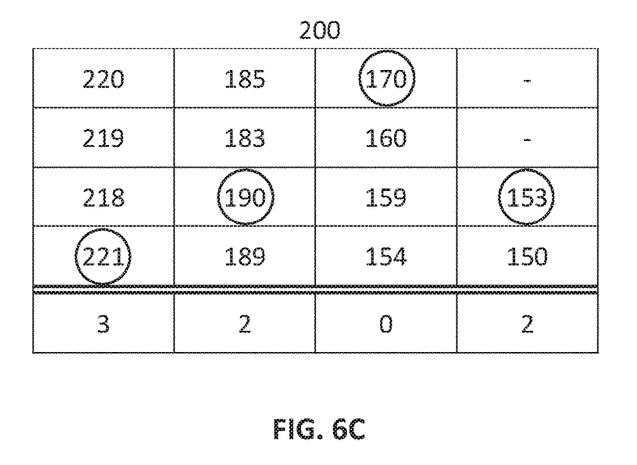
FIG. 6C depicts the elements of the data structure after the operations of FIG. 6A.

An example sequence of operations for a cache hit on a middle ring buffer is now described in connection with FIGS. 6A-6C. In ACT 610, element $e_x$ corresponding to the cache hit is identified at a specific location in source ring buffer $R_x$. In the example, "155" corresponds to IO and is identified at position 3 of the third ring buffer.

In ACT 620, the element $e_x$ is deleted from its current position. In the example, "155" is deleted.

In ACT 630, a counter i indicating the destination ring buffer is set to 0.

In ACT 640, a new element is inserted into the position of the smallest element of ring buffer $R_i$. In the example, the value "155" is changed to "221" which is assumed to be the IO number associated with the new IO.

In ACT 650, the smallest element of ring buffer $R_i$ is moved to the position of the smallest element of $R_{i+1}$. In the example, "190" is moved to the position of "170."

In ACT 660, a determination is made of whether the ring buffer $R_{i+1}$ is ring buffer $R_x$. If not (NO in ACT 660), the counter i is incremented by one (ACT 670), and processing returns to ACT 650. In the example, the second ring buffer is not the source third ring buffer. Accordingly, processing repeats and "170" is moved to the position of "154." Now, the third ring buffer is the source ring buffer (YES in ACT 660), so processing then proceeds to ACT 680.

In ACT 680, each element from the smallest position to the position just below the element that was moved is shifted up one position. In the example, "154" is moved up one position to the previous position of "155." No further updating of subsequent ring buffers is required because the "155" was deleted.

In ACT 690, each index of the updated ring buffers is updated as necessary. In the example, the first index is updated to 3, the second index is updated to 2, and the third index is updated to 0. The indexes of subsequent ring buffers do not need to be updated because the subsequent ring buffers have not been updated.

Figure 7:
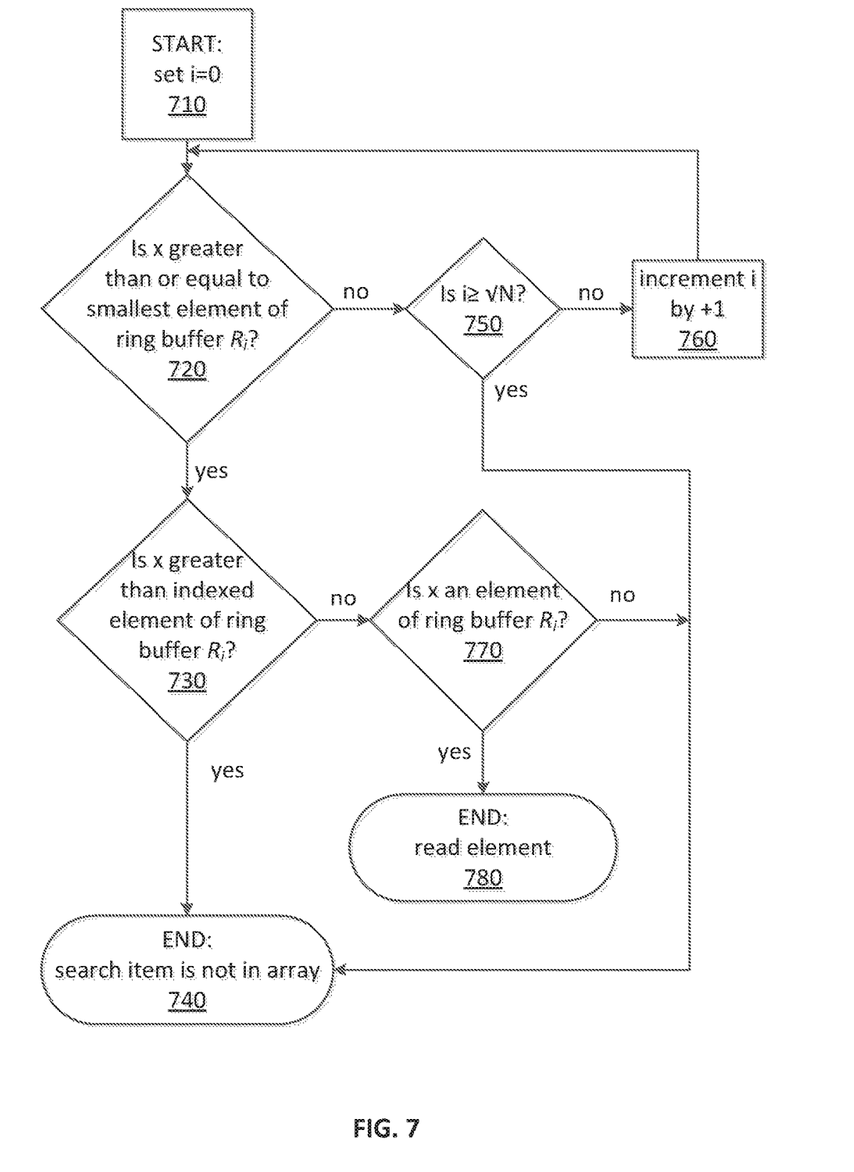
FIG. 7 depicts an example sequence of operations for searching for an element in the data structure.

FIG. 7 depicts an example search process for determining the location of the element x in the array. The search process may be carried out in response to an IO request for an IO number corresponding to a particular LBA by the hypervisor 117. Searching in ring buffer array 200 is similar to searching in a BTree data structure in that only the smallest element (i.e., the element at the position above the indexed element) of each ring buffer needs to be initially compared. In the example shown in FIG. 6, the search starts at the first ring buffer $R_0$. Thus, in ACT 710, a counter i is set to i=0.

In ACT 720, the element x is compared to the smallest element of ring buffer $R_i$. If x is greater than or equal to the smallest element of ring buffer $R_x$ (YES in ACT 720), the processing proceeds to ACT 730.

In ACT 730, the element x is compared to the indexed element of ring buffer $R_i$ (i.e., the element at the position indicated by the index of the ring buffer). If x is greater than the indexed element of ring buffer $R_i$, it is determined that element x is not in the array and processing ends (ACT 740).

If x is not greater than or equal to the smallest element of ring buffer $R_x$ (NO in ACT 720), processing proceeds to ACT 750. In ACT 750, whether i≥√N is determined. If i<√N (NO in ACT 750), then i is incremented by +1, and processing returns to ACT 720. If i≥√N (YES in ACT 750), then it is determined that element x is not in the array and processing ends (ACT 740). That is, if x is smaller than the smallest element of ring buffer $R_{\sqrt{N}}$, then it is determined the element x is not in the array, and a cache miss is indicated.

If x is not greater than the indexed element of ring buffer $R_x$ (NO in ACT 730), processing proceeds to ACT 770. In ACT 770, x is sequentially compared to each element of ring buffer $R_x$ until a match is found (YES in ACT 770, e.g., cache hit) or until it is determined that x is not in ring buffer $R_x$ (NO in ACT 770, e.g., cache miss). That is, when x is found to be greater than or equal to the smallest element of ring buffer $R_x$ and smaller than the indexed element of ring buffer $R_i$, then it is determined that the element matches one of the elements of ring buffer $R_x$ (cache hit) or is not in the array at all (cache miss). If x is found in the ring buffer $R_x$ (cache hit), the location and content of the matching element are read and passed to the hypervisor 114. Also, the element is deleted from its current location and a new element inserted in the top position of the ring buffer array 200, as described above in connection with FIGS. 6A-6C.

Figure 8:
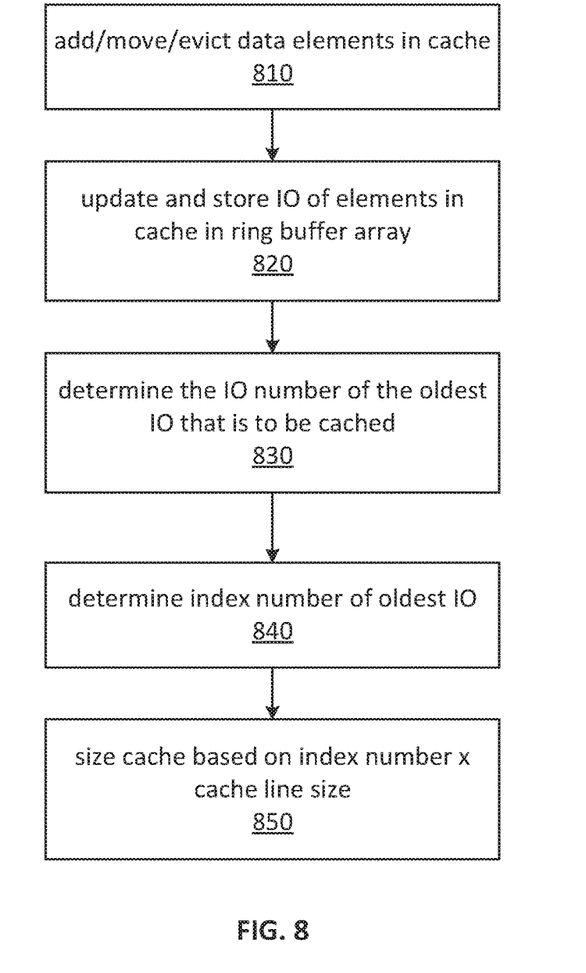
FIG. 8 depicts an example sequence of operations for determining a size of a flash cache.

A description of a cache sizing operation is now described in connection with FIG. 8. In ACT 810, data elements are added, moved and/or evicted from the cache.

In ACT 820, as the data elements are added, moved and/or evicted from the cache, the first and second cache management data structures are updated in the manner described above.

In ACT 830, the IO number of the oldest IO that is to be cached is determined. In one embodiment, this IO number is determined based on the observed differences between two adjacent entries in the second cache management data structure. For example, if the differences in the IO numbers between two adjacent entries in the second cache management data structure do not become significant until entry M and entry M+1, the IO number in entry M is set as the oldest IO to be cached. In another embodiment, the difference between a current IO and a predetermined number of IOs is calculated, and the oldest IO to be cached is the smallest IO number within that calculated difference. In another embodiment, the IO number of the oldest IO that is to be cached is determined based on a time criterion. For example, if data items for IOs that have been issued more than X seconds ago are excluded according to the time criterion, the IO number of the IO that was issued approximately X seconds ago is determined as the oldest IO to be cached.

In ACT 840, the index value corresponding to the oldest IO to be cached is determined.

In ACT 850, the index value determined in ACT 840 is multiplied by the size of one cache line to obtain the total cache size.

The update (insert/delete) improvements of the ring buffer array as described above can be further enhanced by recursively applying the ring structure on each column. Instead of organizing the data into a square of √N×√N, a tall rectangle of $N^{1/3} \times N^{2/3}$ can be used. Using the above-described update operations, the number of rewrites is at most $$\sqrt{N^{\frac{2}{3}}} \text{ or } N^{\frac{1}{3}}.$$

That is, the time complexity of update is $O(N^{1/3})$. Moreover, the space overhead for the index is improved to $N^{1/3}$.

If a tall rectangle of $N^{1/4} \times N^{3/4}$ is used, the time complexity of update is $O(N^{1/4})$. Generalizing, applying the ring buffer structure recursively for M times, the overall time complexity of update is $$O\left(MN^{\frac{1}{M}}\right).$$

The factor M in the time complexity represents the overhead of adding the index for each ring buffer.

Figure 9:
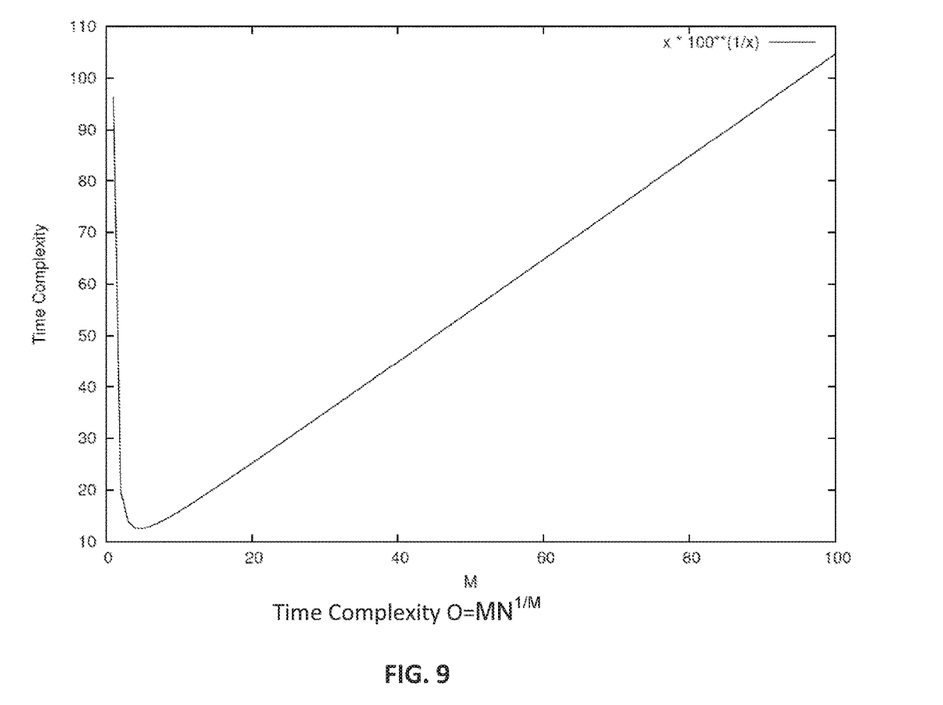
FIG. 9 depicts a relationship between time complexity and recursion M of a ring buffer arrangement.

FIG. 9 depicts the time complexity O as a function of M for $$O\left(MN^{\frac{1}{M}}\right).$$

As can be seen in FIG. 9, the function has a minimum value for O, where the derivative with respect to M is zero.

Calculating the minimum, first rewrite the equation in terms of x:

$$xN^{\frac{1}{x}}. \quad (1)$$

Now, the derivative of Equation (1) is:

$$\frac{\partial}{\partial x}\left(xN^{\frac{1}{x}}\right) = \frac{N^{\frac{1}{x}}(x - \log(N))}{x}. \quad (2)$$

Equation (2) is zero where x=log(N). Substituting into Equation (1):

$$xN^{\frac{1}{x}} = \log(N)N^{\frac{1}{\log(N)}} = e\log(N). \quad (3)$$

Accordingly, the fractal algorithm has a time complexity of O(log(N)) with O(log(N)) space overhead.

Figure 10:
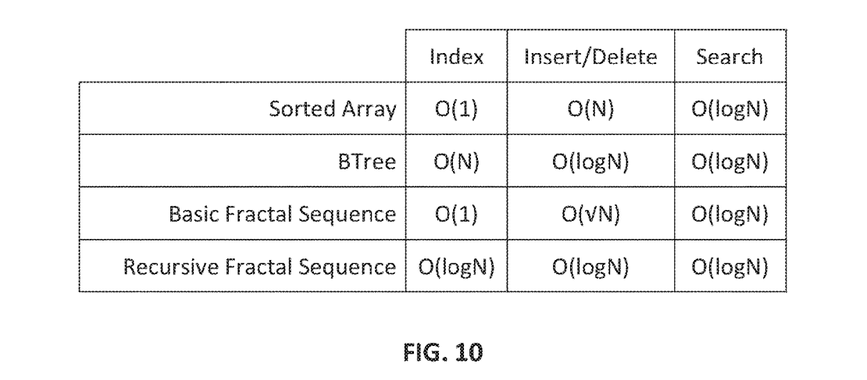
FIG. 10 depicts time complexity for various operations with respect to various data structures.

FIG. 10 illustrates a comparison of the time complexity for operations using: sorted array, BTree, basic fractal sequence ($\sqrt{N} \times \sqrt{N}$ ring buffer array), and recursive fractal sequence. As can be seen, the basic fractal sequence has the same time complexity for index as a sorted array, and is improved with respect to a Btree. Further, update operations in the basic fractal sequence is improved with respect to a sorted array.

In addition, the recursive fractal sequence has significantly better time complexity for index and also improves update operations with respect to a BTree.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of sizing a cache using an ordered data structure having data elements that represent different target locations of input-output operations (IOs) in the cache, the data elements being sorted according to an access recency parameter that represents how recently an IO has been issued for the different target locations represented thereby, said method comprising:
    as new IOs are issued, continually updating the ordered data structure to arrange the data elements in the order of the access recency parameter; and
    setting a size of the cache based on the access recency parameters of the data elements in the ordered data structure, wherein the ordered data structure includes:
    an ordered first ring buffer having at least two positions, a first pointer that indicates a position of a data element in the first ring buffer that has the largest access recency parameter among the data elements in the first ring buffer,
    an ordered second ring buffer ranked below the first ring buffer and having at least two positions, and a second pointer that indicates a position of a data element in the second ring buffer that has the largest access recency parameter among the data elements in the second ring buffer, and
    when a new IO is issued for a target location represented by a data element in the second ring buffer, the updating of the ordered data structure in response to the new IO includes updating only one position in the first ring buffer, and the first pointer to point to a position in the first ring buffer that contains a data element having the largest access recency parameter among data elements of the first ring buffer, and updating less than all the positions in the second ring buffer and the second pointer to point to a position in the second ring buffer that contains a data element having the largest access recency parameter among data elements of the second ring buffer.

2. The method of claim 1, wherein the access recency parameter is an IO number that increments each time a new IO is issued.

3. The method of claim 2, wherein the size of the cache is set based on a number of the data elements that have IO numbers within a predefined range.

4. The method of claim 1, wherein the updating of the ordered data structure in response to a new IO includes:
    inserting a data element at a first position of the ordered data structure; and
    deleting a data element from a middle position of the ordered data structure.

5. The method of claim 4, wherein
    the ordered data structure includes a third ring buffer ranked below the second ring buffer and having at least two positions, and a third pointer that indicates a start position of the third ring buffer, and
    the updating of the ordered data structure in response to a new IO does not include updating of the third ring buffer and the third pointer if the data element is deleted from the second ring buffer.

6. The method of claim 1, further comprising:
    for each new IO that is issued,
    determining whether a target location of the new IO is a new target location not represented in the ordered data structure using a hash table having multiple entries, each of the multiple entries storing a different target location and an access recency parameter associated therewith.

7. The method of claim 6, further comprising:
    if the target location of the new IO is a new target location not represented in the ordered data structure,
    adding the target location and an access recency parameter associated therewith as a new entry of the hash table.

8. The method of claim 6, further comprising:
    if the target location of the new IO is represented in the ordered data structure,
    updating the access recency parameter associated with the target location stored in the hash table.

9. The method of claim 8, further comprising:
    deleting the data element representing the target location prior to the new IO from the ordered data structure; and
    inserting the data element representing the target location of the new IO to the ordered data structure.

10. A non-transitory computer readable medium comprising instructions that are executable in a computing device, wherein the instructions when executed in the computing device cause the computing device to carry out a method of sizing a cache using an ordered data structure having data elements that represent different target locations of input-output operations (IOs) in the cache, the data elements being sorted according to an access recency parameter that represents how recently an IO has been issued for the different target locations represented thereby, said method comprising:
    as new IOs are issued, continually updating the ordered data structure to arrange the data elements in the order of the access recency parameter; and
    setting a size of the cache based on the access recency parameters of the data elements in the ordered data structure, wherein the ordered data structure includes:
    an ordered first ring buffer having at least two positions, a first pointer that indicates a position of a data element in the first ring buffer that has the largest access recency parameter among the data elements in the first ring buffer, an ordered second ring buffer ranked below the first ring buffer and having at least two positions, and a second pointer that indicates a position of a data element in the second ring buffer that has the largest access recency parameter among the data elements in the second ring buffer, and
    when a new IO is issued for a target location represented by a data element in the second ring buffer, the updating of the ordered data structure in response to the new IO includes updating only one position in the first ring buffer, and the first pointer to point to a position in the first ring buffer that contains a data element having the largest access recency parameter among data elements of the first ring buffer, and updating less than all the positions in the second ring buffer and the second pointer to point to a position in the second ring buffer that contains a data element having the largest access recency parameter among data elements of the second ring buffer.

11. The non-transitory computer readable medium of claim 10, wherein the access recency parameter is an IO number that increments each time a new IO is issued.

12. The non-transitory computer readable medium of claim 11, wherein the size of the cache is set based on a number of the data elements that have IO numbers within a predefined range.

13. The non-transitory computer readable medium of claim 10, wherein the updating of the ordered data structure in response to a new IO includes: inserting a data element at a first position of the ordered data structure; and deleting a data element from a middle position of the ordered data structure.

14. The non-transitory computer readable medium of claim 13, wherein
the ordered data structure includes a third ring buffer ranked below the second ring buffer and having at least two positions, and a third pointer that indicates a start position of the third ring buffer, and
the updating of the ordered data structure in response to a new IO does not include updating of the third ring buffer and the third pointer if the data element is deleted from the second ring buffer.

15. The non-transitory computer readable medium of claim 10, wherein the method further comprises:
for each new IO that is issued, determining whether a target location of the new IO is a new target location not represented in the ordered data structure using a hash table having multiple entries, each of the multiple entries storing a different target location and an access recency parameter associated therewith.

16. The non-transitory computer readable medium of claim 15, wherein the method further comprises:
if the target location of the new IO is a new target location not represented in the ordered data structure, adding the target location and an access recency parameter associated therewith as a new entry of the hash table.

17. The non-transitory computer readable medium of claim 15, wherein the method further comprises:
if the target location of the new IO is represented in the ordered data structure, updating the access recency parameter associated with the target location stored in the hash table.

18. The non-transitory computer readable medium of claim 17, further comprising:
deleting the data element representing the target location prior to the new IO from the ordered data structure; and
inserting the data element representing the target location of the new IO to the ordered data structure.

19. A computer system comprising a processor programmed to:
issue input-output operations (IOs) to a storage device,
populate an ordered data structure for sizing a cache for the storage device as new IOs are issued, the ordered data structure having data elements that represent different target locations of the IOs in the cache, and are sorted according to an access recency parameter that represents how recently an IO has been issued for the different target locations represented thereby, and
set a size of the cache based on the access recency parameters of the data elements in the ordered data structure, wherein
the ordered data structure includes:
an ordered first ring buffer having at least two positions, a first pointer that indicates a position of a data element in the first ring buffer that has the largest access recency parameter among the data elements in the first ring buffer, an ordered second ring buffer ranked below the first ring buffer and having at least two positions, and a second pointer that indicates a position of a data element in the second ring buffer that has the largest access recency parameter among the data elements in the second ring buffer, and
when a new IO is issued for a target location represented by a data element in the second ring buffer, the updating of the ordered data structure in response to a new IO includes updating only one position in the first ring buffer, and the first pointer to point to a position in the first ring buffer that contains a data element having the largest access recency parameter among data elements of the first ring buffer, and updating less than all the positions in the second ring buffer and the second pointer to point to a position in the second ring buffer that contains a data element having the largest access recency parameter among data elements of the second ring buffer.

20. The computer system of claim 19, wherein the cache is one of an input/output buffer configured in memory and a flash memory cache in the IO path between the processor and the storage device.

* * * * *